(12) United States Patent
Ichikawa

(10) Patent No.: US 11,254,227 B2
(45) Date of Patent: Feb. 22, 2022

(54) VEHICLE AND POWER EQUIPMENT

(71) Applicant: Toyota Jidosha Kabushiki Kaisha, Toyota (JP)

(72) Inventor: Shinji Ichikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/167,952

(22) Filed: Oct. 23, 2018

(65) Prior Publication Data
US 2019/0143825 A1 May 16, 2019

(30) Foreign Application Priority Data
Nov. 14, 2017 (JP) .............................. JP2017-219050

(51) Int. Cl.
*B60L 53/16* (2019.01)
*B60L 55/00* (2019.01)
*B60L 53/65* (2019.01)
*H01R 13/66* (2006.01)

(52) U.S. Cl.
CPC ............... *B60L 53/16* (2019.02); *B60L 53/65* (2019.02); *B60L 55/00* (2019.02); *B60L 2240/622* (2013.01); *B60L 2240/72* (2013.01); *B60L 2250/16* (2013.01); *H01R 13/66* (2013.01)

(58) Field of Classification Search
CPC .......... B60L 53/16; B60L 53/65; B60L 55/00; B60L 2250/16; B60L 2240/72; B60L 2240/622; B60L 2230/12; H01R 13/66; Y04S 10/126; Y04S 30/14; Y02T 90/12; Y02T 90/14; Y02T 10/70; Y02T 10/7072; Y02T 90/16; Y02T 10/72; Y02T 90/167
See application file for complete search history.

(56) References Cited

U.S. PATENT DOCUMENTS

| 8,384,359 | B2 * | 2/2013 | Narel ........................ H02J 3/32 320/162 |
| 8,581,699 | B2 * | 11/2013 | Kojima .............. G07C 9/00309 340/8.1 |
| 8,772,961 | B2 * | 7/2014 | Ichikawa .................. B60L 3/04 307/9.1 |
| 9,401,610 | B2 * | 7/2016 | Uyeki ..................... B60L 53/11 |
| 10,345,115 | B2 * | 7/2019 | Seok .................. G01C 21/3469 |

(Continued)

FOREIGN PATENT DOCUMENTS

| JP | 2012-178909 A | 9/2012 |
| JP | 5123419 B1 | 1/2013 |

(Continued)

*Primary Examiner* — Stacy Whitmore
(74) *Attorney, Agent, or Firm* — Dinsmore & Shohl LLP

(57) ABSTRACT

A vehicle is configured to be selectively connected to any one of a plurality of pieces of power equipment. The vehicle includes a power storage device, and a controller configured to control charge to the power storage device from the power equipment, and discharge from the power storage device to the power equipment. When power equipment connected to fee vehicle has been installed at a preregistered location, the controller permits discharge to that power equipment. When the power equipment connected to the vehicle has been installed at the preregistered location, the controller prohibits discharge to that power equipment unless a user performs operation of permitting discharge.

6 Claims, 9 Drawing Sheets

(56) References Cited

U.S. PATENT DOCUMENTS

| | | | | |
|---|---|---|---|---|
| 10,464,434 B2* | 11/2019 | Homma | | B60L 53/66 |
| 2009/0021385 A1* | 1/2009 | Kelty | | B60L 53/30 |
| | | | | 340/660 |
| 2009/0085522 A1* | 4/2009 | Matsumoto | | B60W 10/26 |
| | | | | 320/137 |
| 2009/0139781 A1* | 6/2009 | Straubel | | B60L 50/64 |
| | | | | 180/65.1 |
| 2009/0278492 A1* | 11/2009 | Shimizu | | H02J 50/10 |
| | | | | 320/108 |
| 2010/0045232 A1* | 2/2010 | Chen | | B60L 53/30 |
| | | | | 320/109 |
| 2010/0133900 A1* | 6/2010 | King | | B60L 58/20 |
| | | | | 307/9.1 |
| 2010/0145568 A1* | 6/2010 | Watanabe | | G07C 5/085 |
| | | | | 701/29.6 |
| 2011/0163724 A1* | 7/2011 | Migaud | | B60W 10/08 |
| | | | | 320/136 |
| 2011/0202418 A1* | 8/2011 | Kempton | | B60L 53/64 |
| | | | | 705/26.1 |
| 2012/0016547 A1* | 1/2012 | Aridome | | B60L 58/21 |
| | | | | 701/22 |
| 2012/0157083 A1* | 6/2012 | Otterson | | B60L 55/00 |
| | | | | 455/422.1 |
| 2012/0223675 A1* | 9/2012 | Bianco | | B60L 53/63 |
| | | | | 320/109 |
| 2012/0233062 A1* | 9/2012 | Cornish | | B25J 11/00 |
| | | | | 705/39 |
| 2012/0239571 A1* | 9/2012 | Boot | | B60L 53/665 |
| | | | | 705/44 |
| 2012/0274287 A1* | 11/2012 | Ree | | B60L 3/0046 |
| | | | | 320/162 |
| 2013/0099741 A1* | 4/2013 | Shimizu | | H02J 7/0036 |
| | | | | 320/109 |
| 2013/0099744 A1* | 4/2013 | Falk | | H02J 7/0052 |
| | | | | 320/109 |
| 2013/0103355 A1* | 4/2013 | Unagami | | B60L 58/12 |
| | | | | 702/187 |
| 2013/0106350 A1* | 5/2013 | Ono | | H01M 10/44 |
| | | | | 320/109 |
| 2013/0162208 A1* | 6/2013 | Ohnuki | | B60L 53/18 |
| | | | | 320/109 |
| 2014/0067660 A1* | 3/2014 | Cornish | | G06Q 20/145 |
| | | | | 705/39 |
| 2014/0371962 A1* | 12/2014 | Smith | | B60L 11/1824 |
| | | | | 701/22 |
| 2015/0008888 A1* | 1/2015 | Chevalley | | B60L 11/1824 |
| | | | | 320/137 |
| 2015/0015202 A1* | 1/2015 | Im | | H02J 7/0047 |
| | | | | 320/109 |
| 2015/0069964 A1* | 3/2015 | Kamikihara | | B60L 11/182 |
| | | | | 320/108 |
| 2015/0077054 A1* | 3/2015 | Uyeki | | B60L 55/00 |
| | | | | 320/109 |
| 2015/0084584 A1* | 3/2015 | Monks | | H02J 7/0027 |
| | | | | 320/108 |
| 2015/0165917 A1* | 6/2015 | Robers | | B60L 55/00 |
| | | | | 320/109 |
| 2015/0314699 A1* | 11/2015 | Wakasugi | | B60L 11/1861 |
| | | | | 307/9.1 |
| 2016/0075248 A1* | 3/2016 | Jeong | | B60L 53/64 |
| | | | | 320/162 |
| 2016/0250941 A1* | 9/2016 | O'Connell | | B60L 53/30 |
| | | | | 320/104 |
| 2016/0368390 A1* | 12/2016 | Yang | | B60L 1/003 |
| 2016/0368391 A1* | 12/2016 | Kojima | | B60L 3/0069 |
| 2017/0101023 A1* | 4/2017 | Nawata | | B60L 1/006 |
| 2017/0256966 A1* | 9/2017 | Connolly | | B60L 53/14 |
| 2017/0259785 A1* | 9/2017 | Lovett | | E05B 81/80 |
| 2017/0361719 A1* | 12/2017 | Doucet | | B60L 11/1818 |
| 2018/0034271 A1* | 2/2018 | Lam | | B60L 53/64 |
| 2018/0120123 A1* | 5/2018 | Seok | | G01C 21/3691 |
| 2018/0154790 A1* | 6/2018 | Homma | | H02J 7/022 |
| 2018/0154791 A1* | 6/2018 | Homma | | B60L 53/51 |
| 2018/0194242 A1* | 7/2018 | Shumaker | | B60L 3/0069 |
| 2018/0222337 A1* | 8/2018 | Cook | | B60L 53/305 |
| 2018/0229608 A1 | 8/2018 | Kuramoto et al. | | |
| 2018/0241234 A1* | 8/2018 | Liang | | H02J 7/00032 |
| 2018/0257603 A1* | 9/2018 | Taylor | | B60L 1/00 |
| 2018/0270661 A1* | 9/2018 | Luke | | H02J 7/0013 |
| 2018/0345810 A1* | 12/2018 | Shuaib | | H04L 9/3247 |
| 2019/0001833 A1* | 1/2019 | Coburn | | B60L 53/60 |
| 2019/0135133 A1* | 5/2019 | Miller | | B60L 53/12 |
| 2019/0181676 A1* | 6/2019 | Steinbuchel, IV | | B60L 53/65 |
| 2019/0215404 A1* | 7/2019 | Stocker | | B60L 53/305 |
| 2019/0288347 A1* | 9/2019 | Yokoyama | | H01M 10/486 |
| 2020/0094706 A1* | 3/2020 | Outwater | | B60L 55/00 |

FOREIGN PATENT DOCUMENTS

| | | |
|---|---|---|
| WO | 2013/030637 A2 | 3/2013 |
| WO | 2017037911 A1 | 3/2017 |

\* cited by examiner

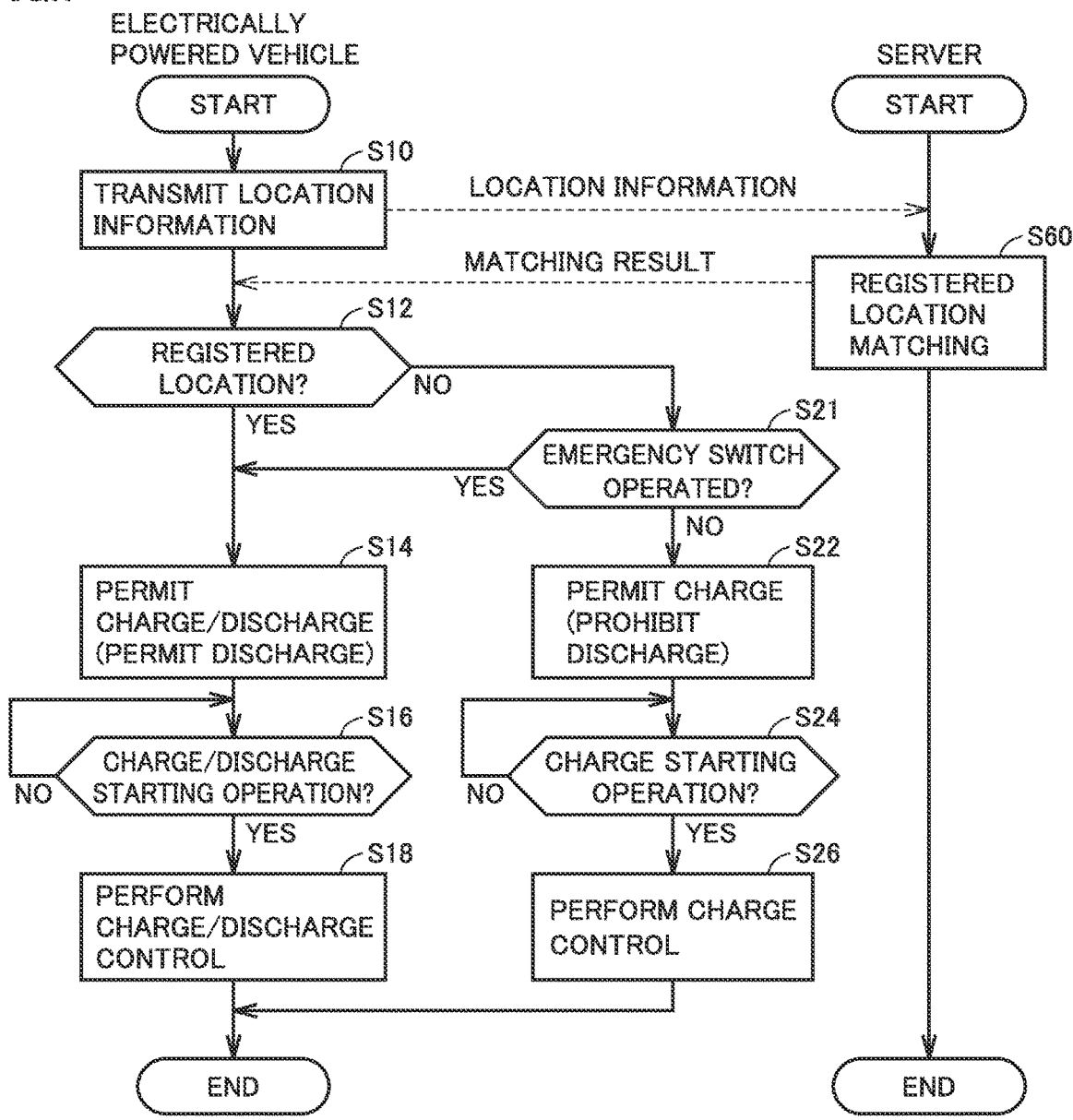

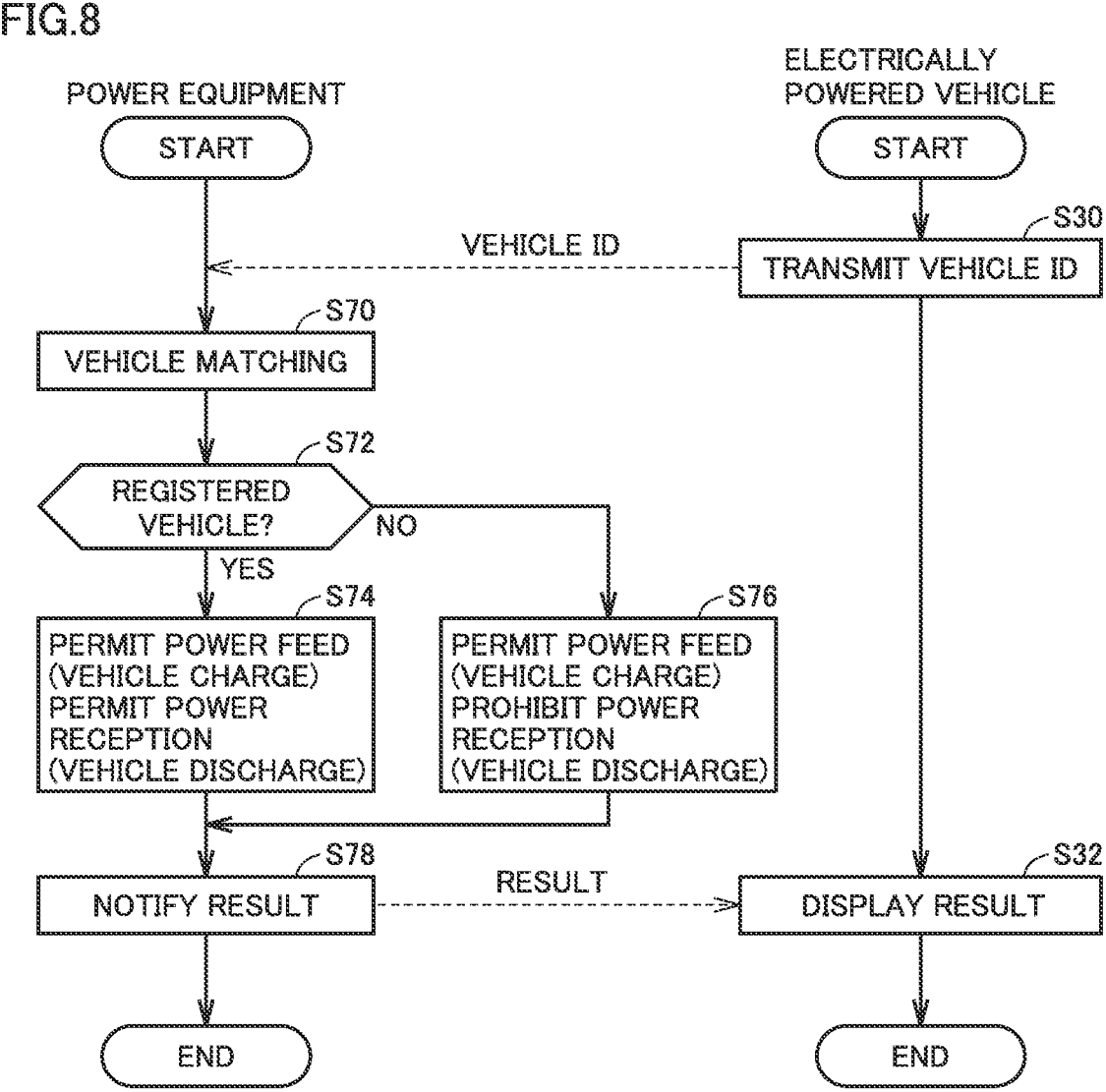

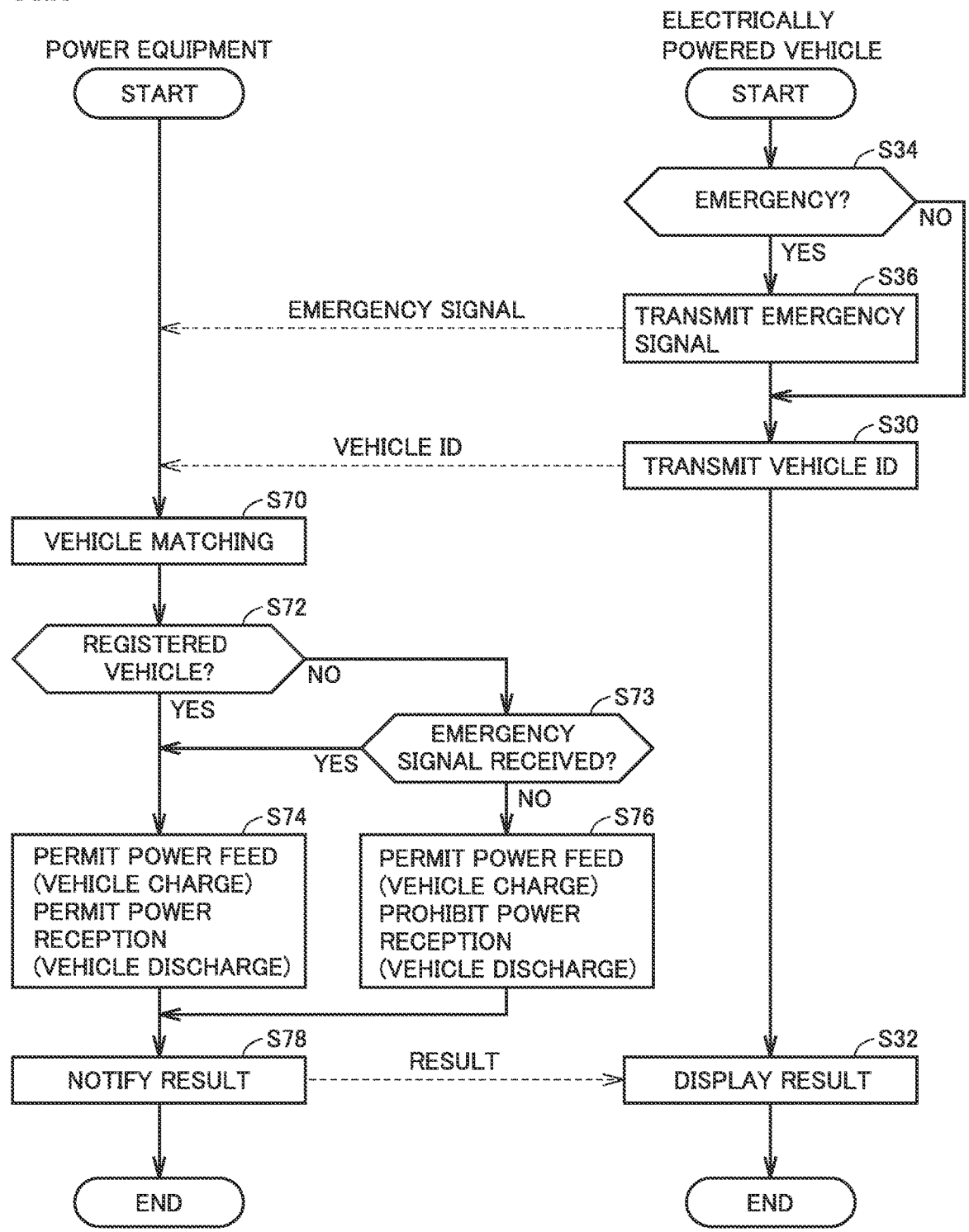

VEHICLE AND POWER EQUIPMENT

CROSS-REFERENCE TO RELATED APPLICATIONS

This nonprovisional application claims priority to Japanese Patent Application No. 2017-219050 filed on Nov. 14, 2017 with the Japan Patent Office, the entire contents of which are hereby incorporated by reference.

BACKGROUND

Field

The present disclosure relates to a vehicle configured to transmit and receive electric power to and from power equipment, and the power equipment.

Description of the Background Art

Japanese Patent No. 5123419 discloses a vehicle configured such that charge to the vehicle from power equipment and discharge from, fee vehicle to the power equipment can beperformed, while the power equipment is connected to a charging inlet of the vehicle.

SUMMARY

As described above, in the vehicle disclosed in Japanese Patent No, 5123439, not only charge hut also discharge can be performed with the power equipment connected to the charging inlet of the vehicle. Thus, when charging the vehicle using power equipment installed at a location other than the home of a user of the vehicle (such as a public power station or other people's property), for example, if a discharge mode is selected at the request of the power equipment, or if the user performs operation of starting discharge by mistake instead of performing operation of starting charge, it is feared that the vehicle will be discharged against the user's intention.

The present disclosure has been made to solve the aforementioned problem, and has an object to prevent a vehicle configured to perform charge/discharge with power equipment from performing discharge to the power equipment against a user's intention.

(1) A vehicle according to the present disclosure is a vehicle configured to be selectively connected to any one of a plurality of pieces of power equipment, the vehicle including: a power storage device; and a controller configured to control charge to the power storage device from power equipment connected to the vehicle, and discharge from the power storage device to the power equipment connected to the vehicle. When the power equipment connected to the vehicle has been installed at a preregistered location, the controller is configured to permit discharge, to the power equipment connected to the vehicle.

According to the vehicle described above, discharge of the vehicle is permitted to power equipment installed at the preregistered location. Stated another way, discharge of the vehicle is not permitted to power equipment installed at a location other than the preregistered location. Accordingly, by setting the home of a user of the vehicle as the preregistered location by the user, for example, discharge of the vehicle can be prevented from taking place against: the user's intention at a location other than the user's home.

(2) In one embodiment, when the power equipment connected to the vehicle has not been installed at the preregistered location, the controller is configured to permit discharge to the power equipment connected to the vehicle on condition that a user of the vehicle has performed predetermined operation.

According to the embodiment described above, discharge of the vehicle is permitted to power equipment installed at a location other than the preregistered location, on condition that the user of the vehicle has performed the predetermined operation (for example, operation of permitting discharge, or operation of pushing an emergency button). Accordingly, discharge of the vehicle at a location other than the user's home can be allowed when requested by the user, while the discharge of the vehicle is made less likely to take place against, the user's intention.

(3) In one embodiment, the controller is configured to permit charge from the power equipment connected to the vehicle, regardless of whether or not the power equipment connected to the vehicle has been installed at the preregistered location.

According to the embodiment described above, charge of the vehicle using power equipment is permitted regardless of whether or not the power equipment has been installed at the preregistered location. Accordingly, the user of the vehicle can readily charge the vehicle at a location other than the user's home.

(4) Power equipment according to the present disclosure is power equipment configured to be selectively connected to any one or a plurality of vehicles, the power equipment including: power receiving equipment configured to receive power from a vehicle connected to the power equipment; power feeding equipment configured to feed power to the vehicle connected to the power equipment; and a controller configured to control the power receiving equipment and the power feeding equipment. When the vehicle connected to the power equipment is a preregistered vehicle, the controller is configured to permit power reception from the vehicle connected to the power equipment.

According to the power equipment described above, power reception from the preregistered vehicle is permitted. Stated another way, power reception from a vehicle other than the preregistered vehicle is not permitted. Accordingly, if the user of the vehicle connects the user's vehicle to power equipment installed at: a location other than the user's home, for example, discharge of the vehicle can be prevented unless the user's vehicle has Been registered with that power equipment. As a result, discharge of the vehicle can be prevented from taking place against the user's intention at a location, other than the user's home.

(5) In one embodiment, when the vehicle connected to the power equipment is not the preregistered vehicle, the controller is configured topermit power reception from the vehicle connected to the power equipment on condition that a predetermined signal has been received from the vehicle connected to the power equipment.

According to the embodiment described above, power reception from a vehicle other than the preregistered vehicle is permitted on condition that the predetermined signal (for example, a signal indicating an emergency) has been received from that vehicle. Accordingly, discharge of the vehicle at a location other than the user's home can be allowed when requested by the user, while the discharge of the vehicle is made less likely to take place against the user's intention.

(6) In one embodiment, the controller is configured to permit power feed to the vehicle connected to the power equipment, regardless of whether or not the vehicle connected to the power equipment is the preregistered vehicle.

According to the configuration described above, power feed from the power equipment to a vehicle is permitted regardless of whether or not the vehicle is the preregistered vehicle. Accordingly, the user of the vehicle can readily charge the vehicle at a location other than the user's home.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 7 is a flowchart (No. 2) showing an example procedure of processes performed by the vehicle and the server.

FIG. 8 is a flowchart (No. 1) showing an example procedure of processes performed by the power equipment and the vehicle.

FIG. 9 is a flowchart (No. 2) showing an example procedure of processes performed by the power equipment and the vehicle.

DESCRIPTION OF THE EMBODIMENTS

Embodiments of the present disclosure will be described hereinafter in detail with reference to the drawings. It should be noted that the same or corresponding parts are designated by the same characters in: the drawings and will not be described repeatedly, <System Configuration>

Figure 1:
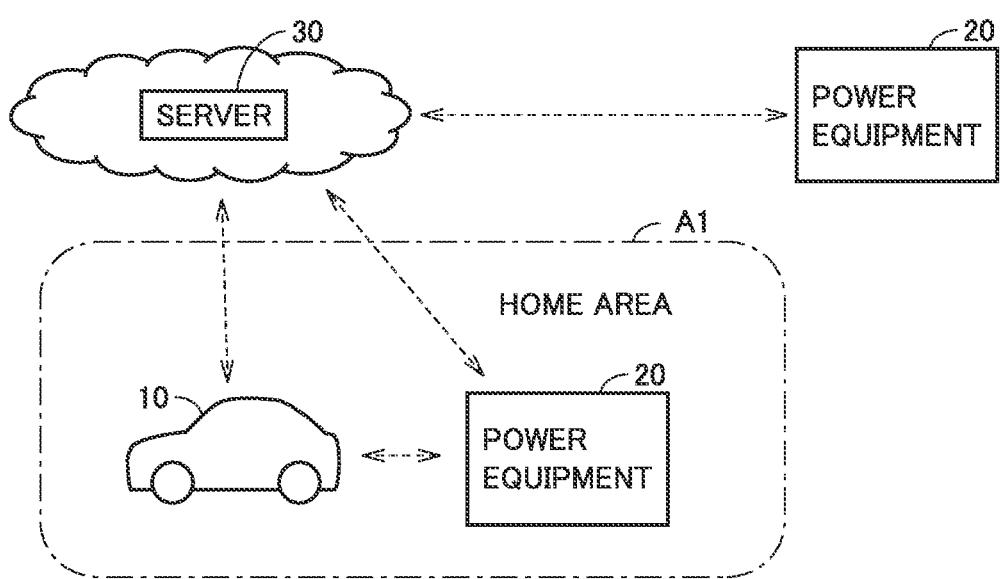
FIG. 1 schematically shows an overall configuration of a power control system including, a vehicle and power equipment.

FIG. 1 schematically shows an overall configuration of a power control system including, a vehicle and power equipment according to the present embodiment. This power control system includes a vehicle 10, a plurality of (in the example shown in FIG. 1, two) pieces of power equipment 20, and a server 30.

Vehicle 10 is an electrically powered vehicle (such as an electric vehicle or a plug-in hybrid vehicle) capable of generating driving power for traveling using electric power, and of transmitting and receiving electric power to and from power equipment 20. Vehicle 10 is configured to be selectively connected to any one of the plurality of pieces of power equipment 20.

Each piece of power equipment 20 includes equipment for vehicle 10 to perform charge and discharge. Each piece of power equipment 20 is configured to perform wireless communication with vehicle 10 and server 30. One of the plurality of pieces of power equipment 20 is installed in a home area A1 of a user of vehicle 10, and one of the plurality of pieces of power equipment 20 is installed at a location other than home area A1 (for example, a public power station or other people's property).

Server 30 is configured to perform wireless communication with vehicle 10 and the plurality of pieces of power equipment 20.

Figure 2:
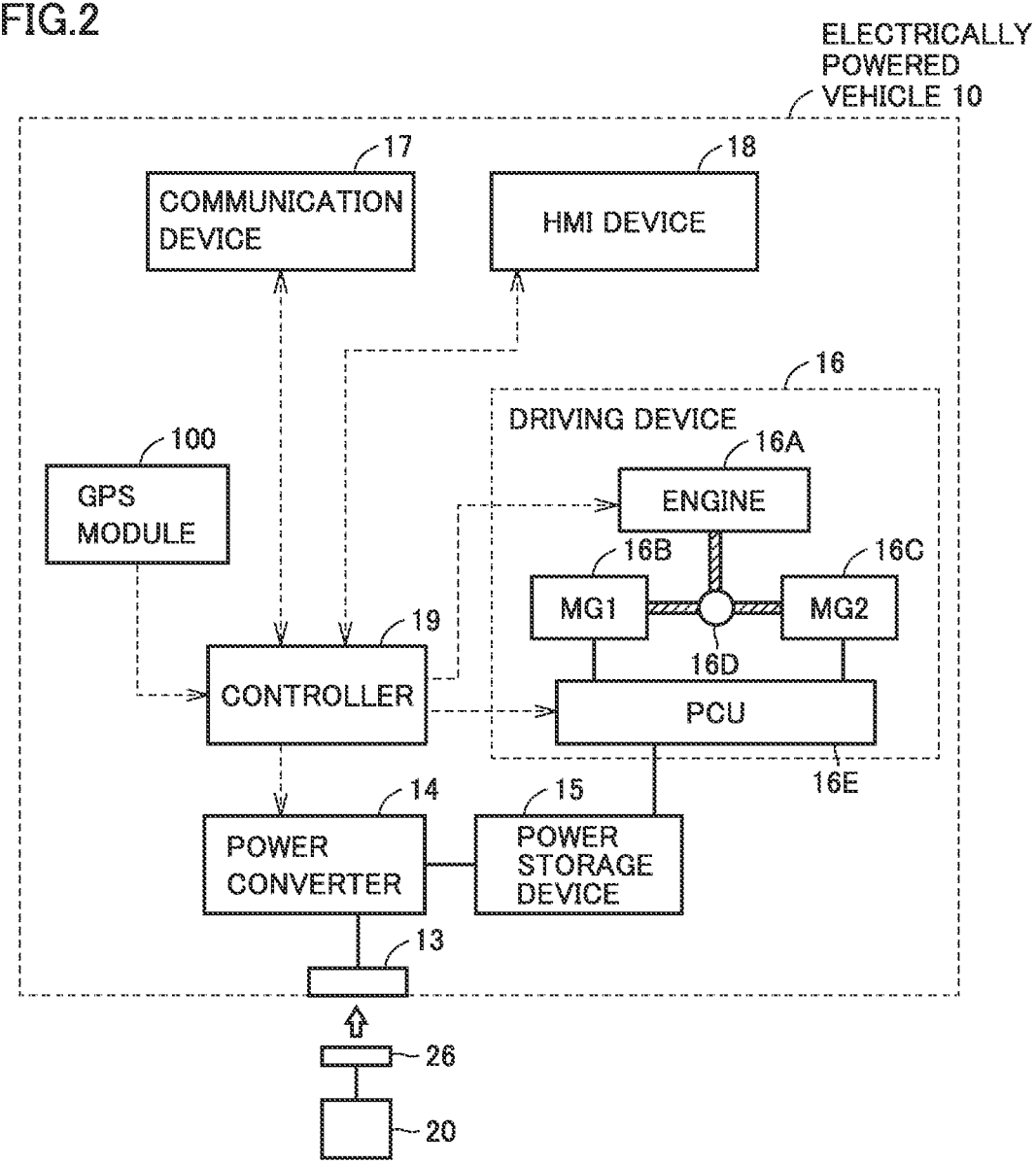
FIG. 2 is a diagram (No. 1) showing an example configuration of the vehicle.

FIG. 2 shows an example configuration of vehicle 10. In the example shown in FIG. 2, vehicle 10 is a so-called plug-in hybrid vehicle. Specifically, vehicle 10 includes a connector 13, a power converter 14, a power storage device 15, a driving device 16, a communication device 37, an HMI (Human Machine Interlace) device 18, a controller 19, and a GPS (Global Positioning System) module 100.

Vehicle 10 is able to charge power storage device 15 using electric power supplied tram power equipment 20. Vehicle 10 is also able to discharge electric power of power storage device 15 to power equipment 20.

Power storage device 15 stores electric power for generating driving power of vehicle 10. Power storage device 15 is configured to include a secondary battery such as a lithium ion battery or a nickel-metal hydride battery, for example.

Driving device 16 generates driving power of vehicle 10. Driving device 16 includes an engine 16A, a first MG (Motor-Generator) 16B, a second MG 16C, a power spilt device 16D, and a PCU (Power Control Unit) 16E.

Engine 16A is an internal combustion engine controlled by a control signal from controller 19. Motive power generated by engine 16A is split into two paths by power split device 16D. One of the paths is for transmission to drive wheels, and the other path is for transmission to first MG 16B.

Each of first MG 16B and second MG 16C is a three-phase AC rotating electric machine driven by PCU 16E. First MG 16B generates electric power using the motive power of engine 16A that has been split by power split device 16D. Second MG 16C generates driving power of vehicle 10 using at least one of the electric power stored in power storage device 15 and the electric power generated by first MG 16B. Second MG 16C also performs regeneration, during deceleration of vehicle 10, using kinetic energy of vehicle 10 transmitted from the drive wheels. The electric power regenerated by second MG 16C is collected by power storage device 15.

Power split device 16D includes a planetary gear mechanism mechanically coupling engine 16A, first MG 16B and second MG 16C.

PCU 16E converts DC power stored in power storage device 15 into AC power with which first MG 16B and second MG 16C can be driven. PCU 16E also converts AC flower generated by first MG 16B and second MG 16C into DC power with which power storage device 15 can be charged.

Connector 13 is configured to be connected to a connector 26 of power equipment 20. Power converter 14 is connected between power storage device 15 and connector 13. Power converter 14 is controlled by a control signal from controller 19. When charging power storage device 15 with electric power supplied from power equipment 20, power converter 14 converts the electric power supplied from power equipment 20 into electric power with which power storage device 15 can be charged. When discharging power storage device 15 to power equipment 20, power converter 14 converts the electric power of power storage device 15 into electric power that can be output to power equipment 20.

Communication device 17 is an interface for performing wireless communication with, devices outside the vehicle (such as power equipment 20 and server 30). Communication device 17, which is connected to controller 19 through a communication line, transmits information, communicated from, controller 19 to the devices outside the vehicle, and communicates information received from the devices outside the vehicle to controller 19.

HMI device 18 is a device for providing various pieces of information to the user of vehicle 10, and accepting operation of the user of vehicle 10. HMI device 18 includes a display, a speaker and the like provided in the interior of the vehicle.

GPS module 100 is a reception device used in a satellite positioning system, GPS module 100 calculates location information of vehicle 10 based on a received signal, and outputs the calculated location information to controller 19.

Although not shown, vehicle 10 further includes a plurality of sensors for detecting various physical quantities required for control of vehicle 10, such as a vehicle speed sensor to detect vehicle speed, a monitor sensor to detect the condition (such as voltage, current or temperature) of power storage device 15, and an acceleration sensor to detect acceleration of vehicle 10. Each of these sensors outputs a detection result to controller 19.

Controller 19 has a built-in CPU and memory (not shown), and controls each device of vehicle 10 (such as power converter 14, driving device 16, communication device 17 and HMI device 18) based on information stored in the memory and information from each sensor. It should be noted that these types of control are not limited to processing by software but can also be processed by dedicated hardware (electronic circuit) constructed therefor.

Figure 3:
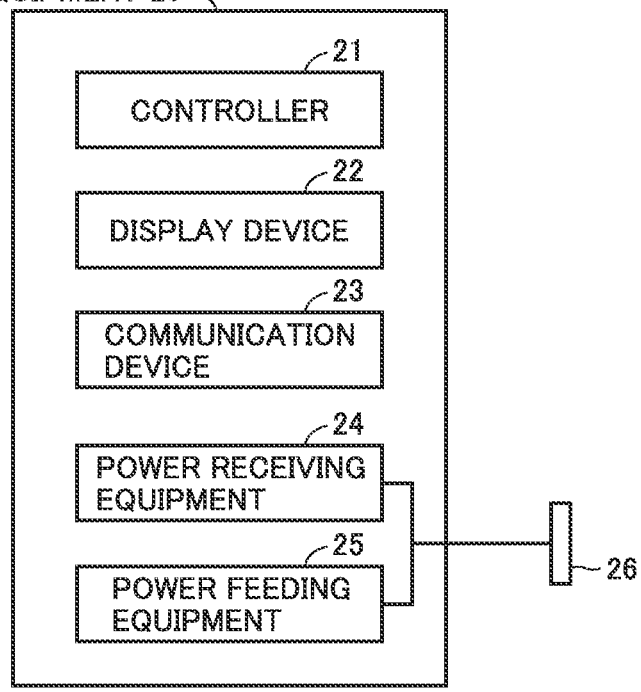
FIG. 3 is a block diagram showing an example configuration of the power equipment.

FIG. 3 is a block diagram showing an example configuration of power equipment 20. Power equipment 20 includes a controller 21, a display device 22, a communication device 23, power receiving equipment 24, power feeding equipment 25, and connector 26.

Display device 22 is a display for displaying various pieces of information to a user of power equipment 20. Communication device 23 is an interface for performing wireless communication with vehicle 10 and server 30.

Power receiving equipment 24 is configured to receive power from vehicle 10 connected to connector 26. Power feeding equipment 25 is configured to feed power to vehicle 10 connected to connector 26.

Controller 21 has a built-in CPU and memory (not shown), and controls each device of power equipment 20 (such as display device 22, communication device 23, power receiving equipment 24 and power feeding equipment 25) based on information stored in the memory and information from each sensor.

Figure 4:
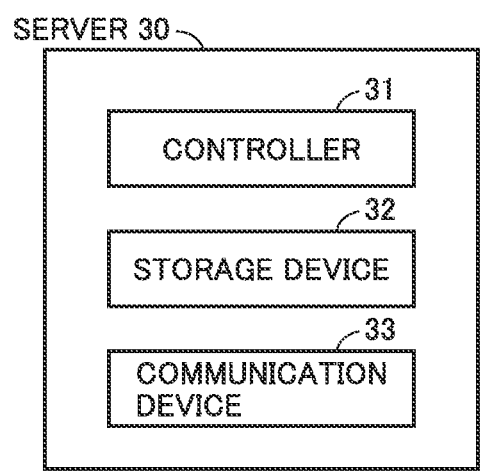
FIG. 4 is a block diagram showing an example configuration of a server.

FIG. 4 is a block diagram showing an example configuration of server 30. Server 30 includes a controller 31, a storage device 32, and a communication device 33.

Communication device 33 is an interface for performing wireless communication with vehicle 10 and power equipment 20. Storage device 32 stores information received by communication device 33 from vehicle 10 and power equipment 20, and the like.

Controller 31 has a built-in CPU (not shown) and controls communication device 33. Controller 31 stores information received from vehicle 10 in storage device 32, and causes a prescribed process to be performed in response to a request from vehicle 10.

<Prevention of Discharge of Vehicle at Location other than Registered Locations>

In the power control system according to the present embodiment, vehicle 10 can perform not only charge but also discharge with power equipment 20 connected to vehicle 10 via connector 13. Thus, when charging vehicle 10 using power equipment 20 installed at a location other than home area A1 (such as a public power station or other people's property), for example, if a discharge mode is selected at the request of power equipment 20, or if the user performs operation of starting discharge by mistake instead of performing operation of starting charge, it is feared that vehicle 10 will be discharged against the user's invention.

In view of this, vehicle 10 according to the present embodiment prohibits discharge of vehicle 10 at a location other than a location preregistered by the user of vehicle 10 (hereinafter also referred to simply as "registered location"). Accordingly, by presetting home area A1 as the registered location by operation of HMI device 18 and the like by the user ox vehicle 10, for example, discharge of vehicle 10 at a location other than home area A1 is prohibited. Thus, discharge of vehicle 10 is prevented from taking place against the user's intention.

It should be noted that the registered location may be stored in the built-in memory of controller 19 of vehicle 10, or may be transmitted from vehicle 10 to server 30 and stored in storage device 32 of server 30. The following mainly describes an example where the registered location set by the user is stored in storage device 32 of server 30.

Figure 5:
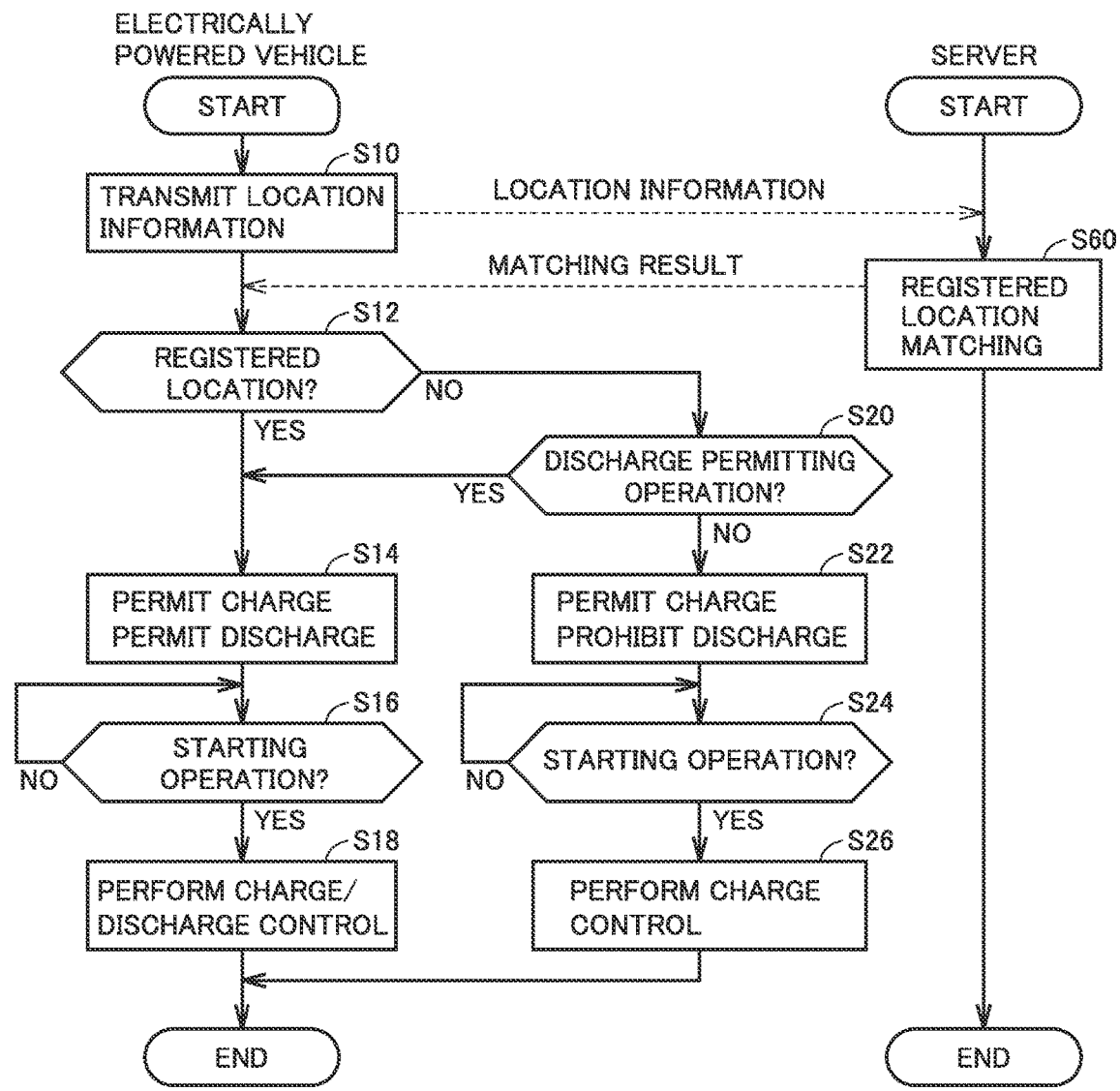
FIG. 5 is a flowchart (No. 1) showing an example procedure of processes performed by the vehicle and the server.

FIG. 5 is a flowchart showing an example procedure of processes performed by vehicle 10 and server 30. FIG. 5 shows the process of vehicle 10 on the left side, and the process of server 30 on the right side. The process of vehicle 10 shown in FIG. 5 is started when connector 26 of power equipment 20 is connected to connector 13 of vehicle 10.

Vehicle 10 (more specifically, controller 19 of vehicle 10) transmits location information of vehicle 10 calculated by GPS module 100 to server 30 (step S10).

When server 30 receives the location information of vehicle 10, server 30 performs a "registered location matching process" of matching the received location of vehicle 10 to the registered location stored in storage device 32, and transmits a matching result to vehicle 10 (step S60). It should be noted that this flowchart assumes that the registered location set by the user is stored in storage device 32 of server 30, as described above.

When vehicle 10 receives the matching result from server 30, vehicle 10 determines, based on the matching result, whether or not power equipment 20 connected to vehicle 10 has been installed at the registered location (step S12). Specifically, when the matching result shows that the location of vehicle 10 is in the vicinity of the registered location, vehicle 10 determines that power equipment 20 connected to vehicle 10 has been installed at the registered location, and otherwise determines that power equipment 20 connected to vehicle 10 has not been installed at the registered location.

When it is determined that power equipment 20 connected to vehicle 10 has been installed at the registered location (YES in step S12), vehicle 10 permits charge and discharge of vehicle 10 (step S14). Then, vehicle 10 determines whether or not the user has started operation of starting charge or discharge (step S16). Then, when the user has started operation of starting charge or discharge (YES in step S16), vehicle 10 performs charge/discharge control in accordance with the starting operation by the user (step S18).

When it is determined that power equipment 20 connected to vehicle 10 has not; been installed at the registered location (NO in step S12), on the other hand, vehicle 10 determines whether or not the user has performed operation of permitting discharge using HMI device 18 (step S20).

When the user has performed operation of permitting discharge (YES in step S20), vehicle 10 permits charge and discharge of vehicle 10 (step S14), and performs the processes of step S16 and its subsequent steps.

When the user has not performed operation of permitting discharge (NO in step S20), vehicle 10 permits charge of vehicle 10, and prohibits discharge of vehicle 10 (step S22). Then, vehicle 10 determines whether or not the user has performed operation of starting charge (step S24). Then, when the user has performed operation of starting charge (YES in step S24), vehicle 10 performs charge control (step S26).

As described above, vehicle 10 according to the present embodiment prohibits discharge of vehicle 10 to power equipment 20 installed at a location other than the registered location set by the user of vehicle 10, unless the user performs operation of permitting discharge. Accordingly, by presetting home area A1 as the registered location by operation of HMI device 18 and the like by the user of vehicle 10, for example, discharge of vehicle 10 at a location other than home area A1 can be prohibited. Thus, discharge of vehicle 10 is prevented from taking place against the user's intention.

Moreover, vehicle 10 according to the present embodiment permits discharge of vehicle 10 even if power equipment 20 connected to vehicle 10 has not been installed at the registered location (for example, home area A1), on condition that the user of vehicle 10 has performed operation of permitting discharge. Accordingly, discharge of vehicle 10 to power equipment 20 installed at a location other than the registered location can be allowed when requested by the user, while the discharge of vehicle 10 is made less likely to take place against the user's intention.

Moreover, vehicle 10 according to the present embodiment permits charge of vehicle 10 regardless of whether or not power equipment 20 has been installed at the registered location. Accordingly, the user of vehicle 10 can readily charge vehicle 10 using power equipment 20 installed at a location other than the registered location.

<First Modification>

The above embodiment has described an example where discharge to power equipment 20 installed at a location other than the registered location is permitted on condition that the user has performed operation of permitting discharge.

However, the condition for permitting discharge to power equipment 20 installed at a location other than the registered location is not limited to the condition that the user has performed operation of permitting discharge. For example, discharge to power equipment 20 installed at a location other than the registered location may be permitted on condition that the user has performed operation of pushing an emergency switch.

Figure 6:
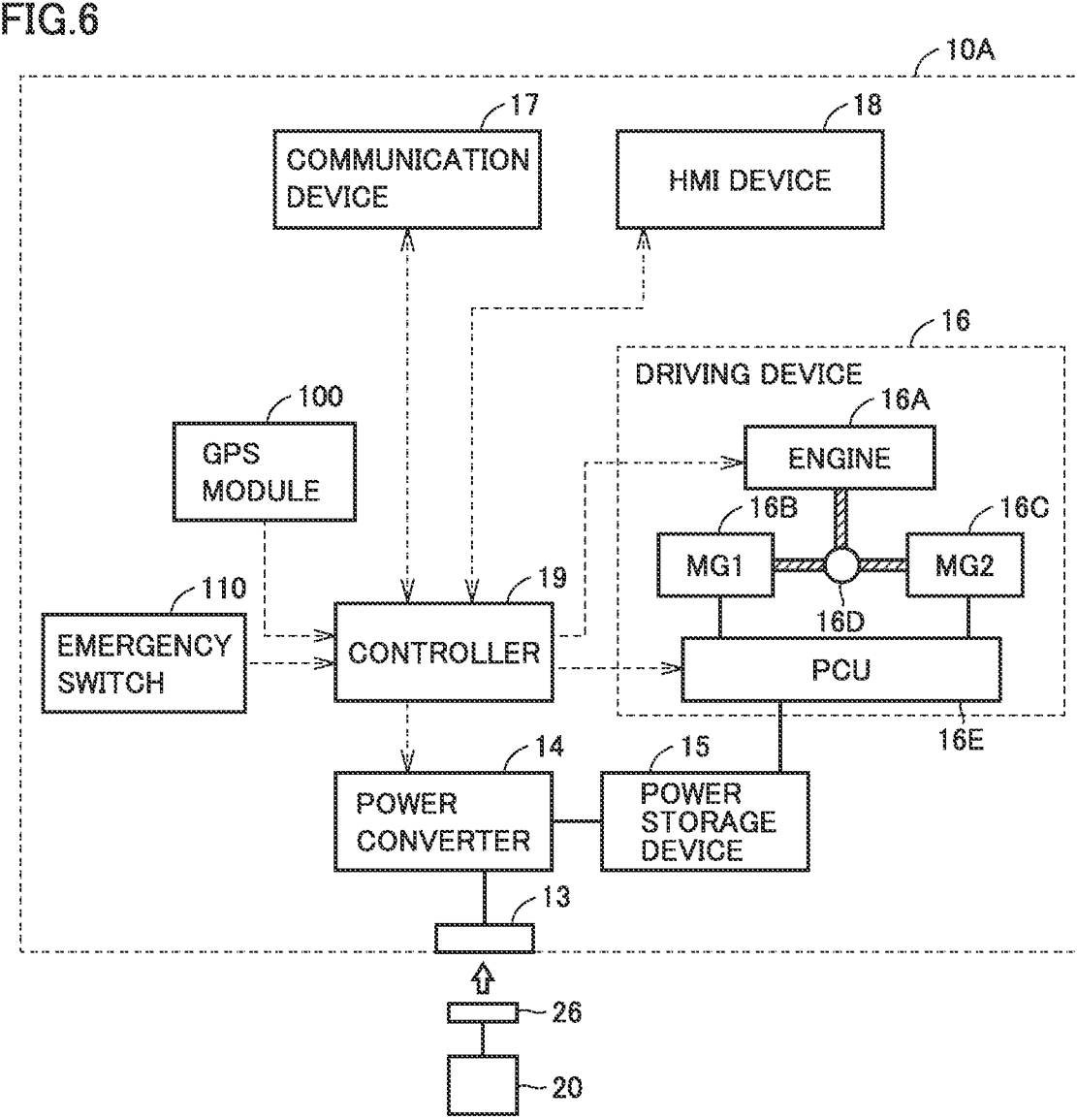
FIG. 6 is a diagram (No. 2) showing an example configuration of the vehicle.

FIG. 6 shows an example configuration of a vehicle 10A according to a first modification. This vehicle 10A additionally includes an emergency switch 110 with respect to above-described vehicle 10 shown in FIG. 2. Since the configuration is otherwise the same as that of vehicle 10 shown in FIG. 2, detailed description will not be repeated here.

Emergency switch 110 is a switch pushed by the user when a need arises to discharge vehicle 10 due to a disaster or the like, for example. When emergency switch 110 is operated by the user, emergency switch 110 informs controller 19 of the operation.

FIG. 7 is a flowchart showing an example procedure of processes performed by vehicle 10A and server 30 according to the first modification. In the flowchart of FIG. 7, the process of step S20 in the flowchart of FIG. 5 has been changed to step S21. Since the other steps (steps denoted by the same numbers as those of the steps shown in FIG. 5 described above) have already been described, detailed description will not be repeated here.

When it is determined that power equipment 20 connected to vehicle 10 has not been installed at the registered location (NO in step S32), vehicle 10A (more specifically, controller 19 of vehicle 10A) determines whether or not the user has operated emergency switch 110 (step S21).

When the user has operated emergency switch 110 (YES in step S21), vehicle 10A permits charge and discharge of vehicle 10A (step S14), and performs the processes of step S16 and its subsequent steps.

When the user has not operated, emergency switch 110 (NO in step S21), on the other hand, vehicle 10A permits charge of vehicle 10A and prohibits discharge of vehicle 10A (step S22).

Accordingly, the user of vehicle 10A can also discharge, by operating emergency switch 110 in the event of an emergency such as a disaster, the electric power of vehicle 10A to power equipment 20 installed at a location other than the registered location.

<Second Modification>

The above embodiment has described an example where vehicle 10 determines whether to permit or prohibit discharge to power equipment 20.

In contrast, power equipment 20 may determine whether to permit or prohibit power reception from vehicle 10. Specifically, in a situation where power equipment 20 is configured to be selectively connected to any one of a plurality of vehicles 10, power equipment 20 may determine whether to permit or prohibit power reception from vehicle 10 connected to power equipment 20, depending on whether or not vehicle 10 is a registered vehicle set by the user.

FIG. 8 is a flowchart showing an example procedure of processes performed by power equipment 20 and vehicle 10 according to a second modification. FIG. 8 shows the process of power equipment 20 on the left side, and the process of vehicle 10 on the right side. The process of vehicle 10 shown in FIG. 8 is started when connector 26 of power equipment 20 is connected to connector 13 of vehicle 10.

Vehicle 10 (more specifically, controller 19 of vehicle 10) transmits vehicle ID information for specifying vehicle 10 to power equipment 20 (step S30).

When power equipment 20 (more specifically, controller 21 of power equipment 20) receives the vehicle ID information from vehicle 10 connected to power equipment 20, power equipment 20 performs a "vehicle matching process" of matching the received vehicle ID to a registered vehicle ID (step S70). It should be noted that the registered vehicle ID is preset by the user of vehicle 10 and stored in the built-in memory of controller 21 of power equipment 20, for example.

When a result of the vehicle matching process shows that the received vehicle ID is the registered vehicle ID (YES in step S72), power equipment 20 permits power feed to connected vehicle 10 (that is, charge of vehicle 10) and power reception from connected vehicle 10 (that is, discharge of vehicle 10) (step S74).

When a result of the vehicle matching process shows that the received vehicle ID is not the registered vehicle ID (NO in step S72), on the other hand, power equipment 20 permits power feed to connected vehicle 10 (that is, charge of vehicle 10), and prohibits power reception from connected vehicle 10 (that is, discharge of vehicle 10) (step S76).

Then, power equipment 20 notifies vehicle 10 of the result of the process of step S74 or step S76 (step S78). Vehicle 10 causes the process result received from power equipment 20 to be displayed on a display of HMI device 18 (step S32).

As described above, power equipment 20 according to the second modification prohibits power reception from vehicle 10 connected to power equipment 20 when that vehicle 10 is not the registered vehicle. Accordingly, if the user of vehicle 10 connects vehicle 10 to power equipment 20 installed at a location other than the user's home, discharge from vehicle 10 to that power equipment 20 cannot be performed unless vehicle 10 has been registered with that power equipment 20. As a result, discharge of vehicle 10 can be prevented from taking place against the user's intention at a location other than the user's home.

Moreover, power equipment 20 according to the second, modification permits power feed from power equipment 20 to vehicle 10 regardless of whether or not that vehicle 10 is the registered vehicle. Accordingly, the user of vehicle 10 can readily charge vehicle 10 using power equipment 20 installed at a location other than the user's home.

<Third Modification>

Power equipment 20 according to the second modification described above prohibits power reception from vehicle 10 connected to power equipment 20 when that vehicle 10 is not the registered vehicle.

However, even if vehicle 10 connected to power equipment 20 is not the registered vehicle, power reception from connected vehicle 10 may be permitted when a signal indicating an emergency is received from that vehicle 10.

FIG. 9 is a flowchart showing an example procedure of processes performed by power equipment 20 and vehicle 10 according to a third modification. The flowchart of FIG. 9 additionally includes step S34, step S36 and step S73 with respect to the flowchart of FIG. 8. Since the other steps (steps denoted by the same numbers as those of the steps shown in FIG. 8 described above) have already been described, detailed description will not be repeated here.

Vehicle 10 determines whether or not an emergency has occurred with the need to discharge vehicle 10 due to a disaster or the like (step S34). In a situation where vehicle 10 is provided with above-described emergency switch 110 as shown in FIG. 6, for example, vehicle 10 determines that an emergency has occurred when the user operates emergency switch 110.

When an emergency has occurred (YES in step S34), vehicle 10 transmits an emergency signal to power equipment 20 (step S36). Then, vehicle 10 transmits vehicle ID information to power equipment 20 (step S30).

When an emergency has not occurred (NO in step S34), vehicle 10 transmits vehicle ID information to power equipment 20 without transmitting an emergency signal to power equipment 20 (step S30).

When power equipment 20 receives the vehicle ID information, power equipment 20 performs the vehicle matching process described above (step S70). Then, when it is determined that the received vehicle ID is not the registered vehicle ID (NO in step S72), power equipment 20 determines whether or not an emergency signal has been received from vehicle 10 (step S73).

When the emergency signal has been received from vehicle 10 (YES in step S73), power equipment 20 permits power feed to connected vehicle 10 (that is, charge of vehicle 10) and power reception from connected vehicle 10 (that is, discharge of vehicle 10) (step S74).

When the emergency signal has not been received from vehicle 10 (NO in step S73), on the other hand, power equipment 20 permits power feed to connected vehicle 10 (that is, charge of vehicle 10), and prohibits power reception from connected vehicle 10 (that is, discharge of vehicle 10) (step S76).

As described above, power equipment 20 according to the third modification permits power reception from vehicle 10 other than, the registered vehicle, on condition that the emergency signal has been received from that vehicle 10. Accordingly, discharge of the vehicle at a location other than the user's home can be allowed when requested by the user, while the discharge of the vehicle is made less likely to take place against the user's intention.

<Fourth Modification>

Although the above embodiment has described ail example where the registered location is stored in storage device 32 of server 30, the registered location may be stored, as already mentioned, in the built-in memory of controller 19 of vehicle 10. In this case, the "registered location matching process" of matching the location of vehicle 10 to the registered location (step S60 of FIG. 5) can be performed not in server 30 but in vehicle 10.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A vehicle configured to be selectively connected to any one of a plurality of pieces of power equipment, the vehicle comprising:
   a power storage device; and
   a controller configured to control charge to the power storage device from power equipment connected to the vehicle, and discharge from the power storage device to the power equipment connected to the vehicle,
   the controller being configured to transmit location information of the vehicle to a server storing a preregistered location,
   when the power equipment connected to the vehicle has been installed at the preregistered location stored in the server, the controller being configured to permit discharge to the power equipment connected to the vehicle,
   when the vehicle connected to the power equipment is not installed at the preregistered location stored in the server, the controller being configured to prohibit discharge to the power equipment connected to the vehicle.

2. The vehicle according to claim 1, wherein
   when the power equipment connected to the vehicle has not been installed at the preregistered location, the controller is configured to permit discharge to the power equipment connected to the vehicle on condition that a user of the vehicle has performed predetermined operation.

3. The vehicle according to claim 1, wherein
   the controller is configured to permit charge from the power equipment connected to the vehicle, regardless of whether or not the power equipment connected to the vehicle has been installed at the preregistered location.

4. Power equipment configured to be selectively connected to any one of a plurality of vehicles, the power equipment comprising:
   power receiving equipment configured to receive power from a vehicle connected to the power equipment;
   power feeding equipment configured to feed power to the vehicle connected to the power equipment; and a controller configured to control the power receiving equipment and the power feeding equipment, the controller being configured to receive a vehicle ID from the vehicle connected to the power equipment, when the vehicle ID received from the vehicle connected to the power equipment is a preregistered vehicle ID, the controller being configured to permit power reception from the vehicle connected to the power equipment, when the vehicle ID received from the vehicle connected to the power equipment is not the preregistered vehicle ID, the controller being configured to prohibit power reception from the vehicle connected to the power equipment.

5. The power equipment according to claim 4, wherein when the vehicle ID received from the vehicle connected to the power equipment is not the preregistered vehicle ID, the controller is configured to permit power reception from the vehicle connected to the power equipment on condition that a predetermined signal has been received from the vehicle connected to the power equipment.

6. The power equipment according to claim 4, wherein the controller is configured to permit power feed to the vehicle connected to the power equipment, regardless of whether or not the vehicle ID received from the vehicle connected to the power equipment is the preregistered vehicle ID.

* * * * *